(12) United States Patent
Cavalcanti et al.

(10) Patent No.: US 9,468,076 B2
(45) Date of Patent: Oct. 11, 2016

(54) METHODS AND APPARATUS FOR MANAGEMENT OF OUTDOOR LIGHTING NETWORKS

(71) Applicant: KONINKLIJKE PHILIPS N.V., Eindhoven (NL)

(72) Inventors: Dave Alberto Tavares Cavalcanti, Mahopac, NY (US); Dan Jiang, Briarcliff Manor, NY (US); Yong Yang, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 60 days.

(21) Appl. No.: 14/372,376

(22) PCT Filed: Jan. 11, 2013

(86) PCT No.: PCT/IB2013/050258
§ 371 (c)(1),
(2) Date: Jul. 15, 2014

(87) PCT Pub. No.: WO2013/108162
PCT Pub. Date: Jul. 25, 2013

(65) Prior Publication Data
US 2014/0354177 A1 Dec. 4, 2014

Related U.S. Application Data

(60) Provisional application No. 61/588,994, filed on Jan. 20, 2012.

(51) Int. Cl.
H05B 37/02 (2006.01)
G05B 15/02 (2006.01)

(52) U.S. Cl.
CPC .......... H05B 37/0254 (2013.01); G05B 15/02 (2013.01); H05B 37/0245 (2013.01); Y02B 20/72 (2013.01)

(58) Field of Classification Search
CPC ..................... H05B 37/0254; H05B 37/0245
USPC .................................. 315/294, 312
See application file for complete search history.

(56) References Cited

U.S. PATENT DOCUMENTS

| 9,144,135 B2 * | 9/2015 | Cleland ............. H05B 37/0245 |
| 9,161,419 B2 * | 10/2015 | Anderson ......... H05B 37/0227 |
| 2007/0085699 A1 | 4/2007 | Walters |
| 2007/0085701 A1 | 4/2007 | Walters |

(Continued)

FOREIGN PATENT DOCUMENTS

| CN | 101617565 A | 12/2009 |
| CN | 101932873 A | 12/2010 |

(Continued)

OTHER PUBLICATIONS

"White Paper: Intelligent Street Lighting", Apr. 2009.

(Continued)

*Primary Examiner* — Don Le

(57) ABSTRACT

Inventive methods and apparatus for management of outdoor lighting networks (130A-C, 230A-C). For example, in some embodiments methods and apparatus are provided that enable communication between a central management system (110, 210) and a plurality of unique outdoor lighting networks (130A-C, 230A-C).

20 Claims, 8 Drawing Sheets

(56) References Cited

U.S. PATENT DOCUMENTS

| | | |
|---|---|---|
| 2010/0029268 A1 | 2/2010 | Myer |
| 2013/0249409 A1* | 9/2013 | VanWagoner ..... H05B 37/0245 315/154 |
| 2015/0213415 A1* | 7/2015 | Yang ................. G05B 19/4083 705/7.17 |

FOREIGN PATENT DOCUMENTS

| | | |
|---|---|---|
| CN | 202085372 U | 12/2011 |
| WO | 2012090142 A2 | 7/2012 |
| WO | 2012161389 A1 | 11/2012 |

OTHER PUBLICATIONS

Application Note: JN-AN-1151: "Low-Cost JenNet IP Gateway" 2010.

"Product Brief—JenNet-IP Network Protocol Stack Low-Power Wireless IP Networking for the Internet of Things", 2011.

Jennic Ltd: "An Introduction to Smart Energy White Paper", Dec. 2009, pp. 1-26.

* cited by examiner

| Attribute | | Description |
|---|---|---|
| Device Type | | Indicates the type of device: LP or segment controller. |
| CMS Address | | The unique application layer address used by the CMS to identify and communicate with the devices. |
| Name | | Text name of the device. |
| Geolocation | | The geographic information such as longitude and latitude coordinates. May also include geolocation data such as street names, and types. |
| Light Point Data | Pole Data | Type, model, and height. |
| | Luminaire Data | Type, model, and manufacturer. |
| | Lamp-ballast Data | Attributes related to the lamp/ballast operation. |
| | Control Device Data | Attributes related to the lighting behavior and control modes supported by the control device. (e.g., on/off configuration, scheduling configuration, color configuration, dimming configuration). |
| Segment Data | | Attributes applicable only to whole segments (not available for light points). |
| Sensor Data | | Attributes of sensors available through the device or connected to the device, may include: sensor type, sensor specific attributes (value format, range, threshold). Light, motion, camera, and/or environment sensors may be used. |
| Vendor Specific Data | | Attributes specific to certain vendors, whose format may not be recognized/understood by the CMS, but the data can be received and stored. The CMS will require special features to access/use such attributes, which may be provided by the corresponding vendor. |

FIG. 5

| Type: SET_CONFIG | Sequence # | Ack Needed | Device Attributes IE |

| Type: CONFIG_REP | Sequence # | Ack Needed | Device Attributes IE |

METHODS AND APPARATUS FOR MANAGEMENT OF OUTDOOR LIGHTING NETWORKS

CROSS-REFERENCE TO PRIOR APPLICATIONS

This application is the U.S. National Phase application under 35 U.S.C. §371 of International Application No. PCT/IB2013/050258, filed on Jan. 11, 2013, which claims the benefit of U.S. Provisional Patent Application No. 61/588,994, filed on Jan. 20, 2012. These applications are hereby incorporated by reference herein.

TECHNICAL FIELD

The present invention is directed generally to management of outdoor lighting networks. More particularly, various inventive methods and apparatus disclosed herein relate to integrated customer management of multiple unique lighting networks.

BACKGROUND

Systems have been introduced for the remote management of an outdoor lighting network (OLN). For example, lighting units of an OLN may be remotely managed to provide control over lighting behavior (e.g., scheduling of the on/off times of the lighting units and/or setting dimming levels of the lighting units) and/or to monitor lighting unit characteristics (e.g., light source status, energy consumption, lighting unit specifications). Management of outdoor lighting networks may provide one or more benefits to customers (e.g., municipalities) such as energy savings, reduced maintenance costs, and/or reduced lighting pollution.

Existing OLNs often utilize proprietary control and/or communication protocols that are not open to other device suppliers. Although the underlying connectivity technologies used in certain OLN implementations may be standard (e.g., certain wireless and/or power-line communications standards), the control and/or communication protocols are often proprietary. Accordingly, a customer with a plurality of OLNs must either utilize only a single vendor for those OLNs or maintain different systems and procedures to remotely manage the OLNs. For example, an OLN customer managing three different OLNs from three different vendors must use three different central management systems (CMS) and related procedures to remotely manage those OLNs—as well as different non-interoperable lighting control products and devices.

It has been proposed to develop a fully customized control and communication protocol between a single CMS and each of a plurality of proprietary OLN implementations. In such a proposal, the CMS would control all functionalities and capabilities of all the OLN implementations—including vendor specific features. However, integration of the entirety of multiple proprietary OLN implementations would require significant effort and expense in light of the many different features and capabilities available in different OLN implementations. Moreover, the complexity of a unified CMS that could support and manage the entirety of the different features and capabilities available in different OLN implementations may make such CMS burdensome to operate.

Thus, there is a need in the art to provide methods and apparatus related to management of multiple unique lighting networks by a customer from a unified CMS, while optionally overcoming one or more disadvantages of other proposals.

SUMMARY

The present disclosure is directed to inventive methods and apparatus for management of outdoor lighting networks. For example, in some embodiments methods and apparatus are provided that enable communication between a single CMS and a plurality of unique outdoor lighting networks. In some embodiments a management system may be provided that includes a single CMS in communication with each of a plurality of multi-vendor outdoor lighting networks, and a plurality of vendor management systems (VMSs), each in communication with one or more of the lighting networks from a single vendor. Also, in some embodiments methods may be provided that relate to managing a plurality of multi-vendor outdoor lighting networks and/or to commissioning and configuring a plurality of multi-vendor outdoor lighting networks.

Generally, in one aspect, an outdoor lighting network management system is provided that includes a plurality of outdoor lighting networks, a central management system in communication with each of the outdoor lighting networks, and a first vendor management system in communication with a first lighting network of the outdoor lighting networks. Each of the outdoor lighting networks includes a plurality of outdoor lighting network devices. The central management system sends configuration commands to each of the outdoor lighting networks and receives outdoor lighting network device information from each of the outdoor lighting networks. The outdoor lighting network device information includes details of the lighting network devices. The configuration commands set a configuration of at least one of the outdoor lighting network devices, and include lighting configuration commands setting light output characteristics of the light sources of the outdoor lighting network devices. Communications between the first lighting network and the first vendor management system commission the first lighting network and are operable to communicate with the first lighting network.

In some embodiments the system further includes a second vendor management system in communication with a second lighting network of the outdoor lighting networks.

In some embodiments at least a group of the configuration commands sent to the first lighting network is also sent to the first vendor management system and verified by the first vendor management system.

In some embodiments the lighting configuration commands include at least one of a dimming configuration, a schedule configuration, a measurements configuration, and a color control configuration.

In some embodiments at least a group of the configuration commands sent to the first lighting network is also sent to the first vendor management system and verified by the first vendor management system prior to altering the configuration of at least one of the outdoor devices of the first lighting network.

In some embodiments the central management system is in communication with each of the outdoor lighting networks via a central management system protocol stack having a first application layer. In some versions of those embodiments the first vendor management system is in communication with the first lighting network via a first vendor protocol stack having a second application layer distinct from the first application layer. In some versions of those embodiments the system further includes a second vendor management system in communication with a second lighting network of the outdoor lighting networks. The second vendor management system is in communication with the second lighting network via a second vendor protocol stack having a third application layer distinct from the first application layer and distinct from the second application layer.

In some embodiments the first outdoor lighting network is topologically interposed between the central management system and the first vendor management system.

In some embodiments the first vendor management system is topologically interposed between the central management system and the first outdoor lighting network.

Generally, in another aspect, a method of managing a plurality of outdoor lighting networks includes the steps of: receiving first central management system configuration commands from a central management system; translating the first central management configuration commands to distinct and different first outdoor lighting network configuration commands readable by first devices of the first outdoor lighting network; receiving second central management system configuration commands from the central management system; translating the second central management configuration commands to distinct and different second outdoor lighting network configuration commands readable by second devices of the second outdoor lighting network; receiving first vendor management commands from a first vendor management system readable by the first devices; and receiving second vendor management commands from a second vendor management system readable by the second devices.

In some embodiments the method further includes the step of receiving device information of the first devices, translating the device information to distinct and different central management system data readable by the central management system, and sending the central management system data to the central management system.

In some embodiments the method further includes the step of validating the first central management configuration commands.

Generally, in another aspect, an outdoor lighting network management apparatus is provided and includes at least one central management system connection. The central management system connection receives central management configuration commands from a central management system. The apparatus also includes at least one controller operable to translate the central management configuration commands to distinct and different central management directed outdoor lighting network configuration commands. The apparatus also includes at least one outdoor lighting network connection sending the central management directed outdoor lighting network configuration commands to at least one outdoor lighting network device. The apparatus also includes at least one a vendor management system input. The vendor management system input receives vendor management commands from a vendor management system.

In some embodiments at least some of the vendor management commands direct whether at least some of the central management directed outdoor lighting network configuration commands are sent to the at least one outdoor lighting network device.

In some embodiments the central management system connection transmits outdoor lighting network device information to the central management system, the outdoor lighting network device information including attributes of the at least one outdoor lighting network device. In some versions of those embodiments the central management system connection transmits outdoor lighting network configuration change confirmation to the central management system, the outdoor lighting network configuration change confirmation sent in response to the at least one outdoor lighting network device changing configuration based on the central management directed outdoor lighting network configuration commands.

In some embodiments the vendor management commands include at least one of outdoor lighting network commissioning commands, outdoor lighting network management commands, outdoor lighting network troubleshooting commands, and outdoor lighting network security management commands.

In some embodiments the central management system connection, the outdoor lighting network connection, and the vendor management system input are all at a direct communication lighting network device.

In some embodiments the central management system connection, the outdoor lighting network connection, and the vendor management system input are all at the vendor management system.

Generally, in another aspect, a method of commissioning and configuring a plurality of multi-vendor outdoor lighting networks is provided. The method may include the steps of: initializing the outdoor lighting network and confirming devices of the outdoor lighting network with a vendor management system; transferring information related to the devices of the outdoor lighting network to the central management system; assigning unique control management system IDs to the devices of the outdoor lighting network; and configuring outdoor lighting devices from the central management system.

In some embodiments the method may further include the step of validating the control management system initiated configuration of one or more devices of the outdoor lighting network at the vendor management system.

The term "light source" should be understood to refer to any one or more of a variety of radiation sources, including, but not limited to, LED-based sources (e.g., various semiconductor-based structures that emit light in response to current, light emitting polymers, organic light emitting diodes (OLEDs), electroluminescent strips, and the like), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and nonvolatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5 illustrates a table of an embodiment of OLN device attributes that may be provided to a CMS.

DETAILED DESCRIPTION

Existing OLNs often utilize proprietary control and/or communication protocols that are not open to other device suppliers. Accordingly, a customer with a plurality of OLNs must either utilize only a single vendor for those OLNs or maintain different systems and procedures to remotely manage a plurality of OLNs. It has been proposed to develop a fully customized control and communication protocol between a single CMS and each of a plurality of proprietary OLN implementations. In such a proposal, the CMS would control all functionalities and capabilities of all the OLN implementations—including vendor specific features. However, integration of the entirety of multiple proprietary OLN implementations into a unified CMS presents drawbacks. Thus, there is a need in the art to provide methods and apparatus related to management of multiple unique outdoor lighting networks by a customer from a unified CMS, while optionally overcoming one or more disadvantages of other proposals.

More generally. Applicants have recognized and appreciated that it would be beneficial to provide inventive methods and apparatus related to integrated customer management of multiple unique outdoor lighting networks.

In view of the foregoing, various embodiments and implementations of the present invention are directed to management of outdoor lighting networks.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described particularly in conjunction with control of light sources and other lighting related aspects of OLNs. However, one or more aspects of the methods and apparatus described herein may be implemented to additionally control one or more aspects of other applications supported by OLN infrastructure such as, for example, surveillance, traffic monitoring, emergency response, and/or public safety. Implementation of the one or more aspects of an OLN management system described herein to control one or more aspects of other applications supported by OLN infrastructures is contemplated without deviating from the scope or spirit of the claimed invention.

Figure 1:
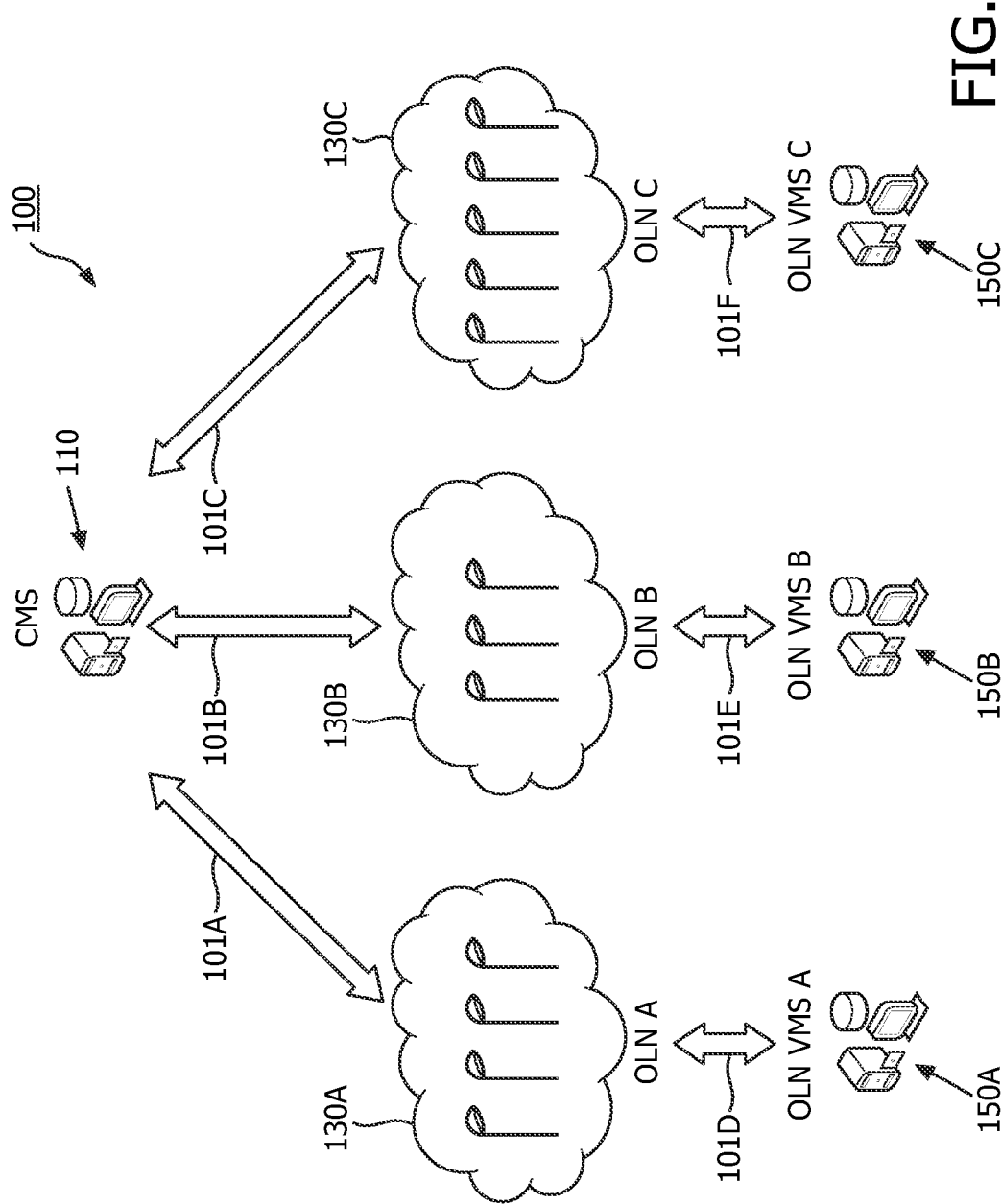
FIG. 1 illustrates a first embodiment of a multi-vendor OLN management system.

Referring to FIG. 1, a first embodiment of a multi-vendor OLN management system 100 is illustrated. The management system 100 includes a single CMS 110 in communication with a first OLN 130A via communication link 101A, a second OLN 130B via communication link 101B, and a third OLN 130C via communication link 101C. The management system 100 also includes a first VMS 150A in communication with the first OLN 130A via communication link 101D, a second VMS 150B in communication with the second OLN 130B via communication link 101E, and a third VMS 150C in communication with the third OLN 130C via communication link 101F. Each of the OLNs 130A-C is topologically interposed between the CMS 110 and a respective of the VMSs 150A-C. Communication links 101A-F may include, for example, one or more wireless, wire/cable, and/or fiber optic links. In some embodiments the CMS 110 and each of the VMSs 150A-C may include a computer such as a desktop computer, a handheld computer device, a server, and/or a bank of servers. The computer may execute computer program instructions that implement one or more of the functions specified in this application that are associated with such device. The CMS 110 may include at least one user interface allowing the customer to perform functions related to the CMS 110 and each of the VMSs 150A-C may include a separate at least one user interface allowing the vendor to perform functions related to its respective VMS 150A-C. In some embodiments the CMS 110 may provide different control and/or information capabilities to certain users. For example, in some embodiments a hierarchical control model may be utilized where authorities at different levels access the CMS 110 with different priorities. As an example, different management levels (e.g., local, city, state, national) could have control and/or information capabilities that are tailored for the particular management level.

Each of the OLNs 130A-C may include one or more direct communication OLN devices such as lighting points, segment/local controllers, and/or other associated assets (e.g., lighting fixtures, sensors, light sources, cameras, storage devices, power sources) that are equipped with control and communication capabilities to enable communication with the CMS 110 and/or with a respective of VMSs 150A-C. Each of the OLNs 130A-C may also optionally include one or more managed OLN devices such as lighting points, sensors, lighting fixtures, light sources, cameras, and/or power sources that may be controlled and managed by the CMS 110 and/or a respective of VMSs 150A-C, but cannot establish direct connection with the CMS 110 or a respective VMS 150A-C. For example, a managed OLN device may be controlled by the CMS 110 and/or a VMS 150A-C via a direct communication OLN device (e.g., a segment controller) that is in communication with the CMS 110 and/or a VMS 150A-C and that controls the managed OLN device based on input received from the CMS 110 and/or a VMS 150A-C.

Generally speaking, and as described in additional detail herein, the CMS 110 communicates with each of the OLNs 130A-C to remotely control and manage certain aspects of the devices of the OLNs 130A-C, while the VMSs 150A-C connect to their respective OLNs 130A-C and manage other aspects of the devices of the OLNs 130A-C. For example, the CMS 110 may communicate with the OLNs 130A-C to control and manage the lighting behavior (e.g., switch on/off, set dimming level, set color level, and/or set lighting schedule) of one or more light sources of the OLNs 130A-C (either directly or via one or more lighting unit, segment controller, etc.). Also, for example, the CMS 110 may communicate with the OLNs 130A-C to control and manage measurements and feedback configuration of one or more OLN devices (e.g., receive and manage measurements and/or feedback from one or more OLN devices, alter measurement and feedback status of one or more OLN devices, and/or alter measurement and feedback reporting frequency of one or more OLN devices). Also, for example, the CMS 110 may also communicate with the OLNs 130A-C to control and manage one or more OLN devices (e.g., manage information of OLN controllers, lighting fixture, sensors, cameras, and/or power sources; switch on/off OLN controllers, lighting fixture, sensors, cameras, and/or power sources; and/or configure controllers, lighting fixture, sensors, cameras, and/or power sources).

The VMSs 150A-C may manage other aspects of the OLNs 130A-C. For example, the VMSs 150A-C may communicate with respective of the OLNs 130A-C to perform OLN commissioning of one or more devices of the OLNs 130A-C (e.g., assigning geographical information to the device, assigning initial installation location information to the device, assigning initial configuration information to the device, and/or assigning relationships between multiple devices). Also, for example, VMSs 150A-C may communicate with respective of the OLNs 130A-C to manage the OLN (e.g., optimize communication between OLN devices, identify and troubleshoot connectivity issues, and/or install software updates). Also, for example, the VMSs 150A-C may also communicate with respective of the OLNs 130A-C to provide security management for the OLN (e.g., verify newly connected OLN devices, detect security breaches, and/or correct security issues). Also, for example, the VMSs 150A-C may also communicate with respective of the OLNs 130A-C to control certain vendor specific functionality of one or more of the devices of the OLN. This bifurcation of aspects of the control and management of an OLN between the CMS and VMS enables a customer to control and manage certain aspects of multi-vendor OLNs, while leaving many vendor-specific aspects of the control and management of the multi-vendor OLNs up to the VMSs. Certain aspects of the control and management of an OLN may also optionally be dictated by either the CMS or the VMS. For example, the CMS may be able to set reporting parameters in certain situations (e.g., at setup and/or in an override situation).

Figure 2:
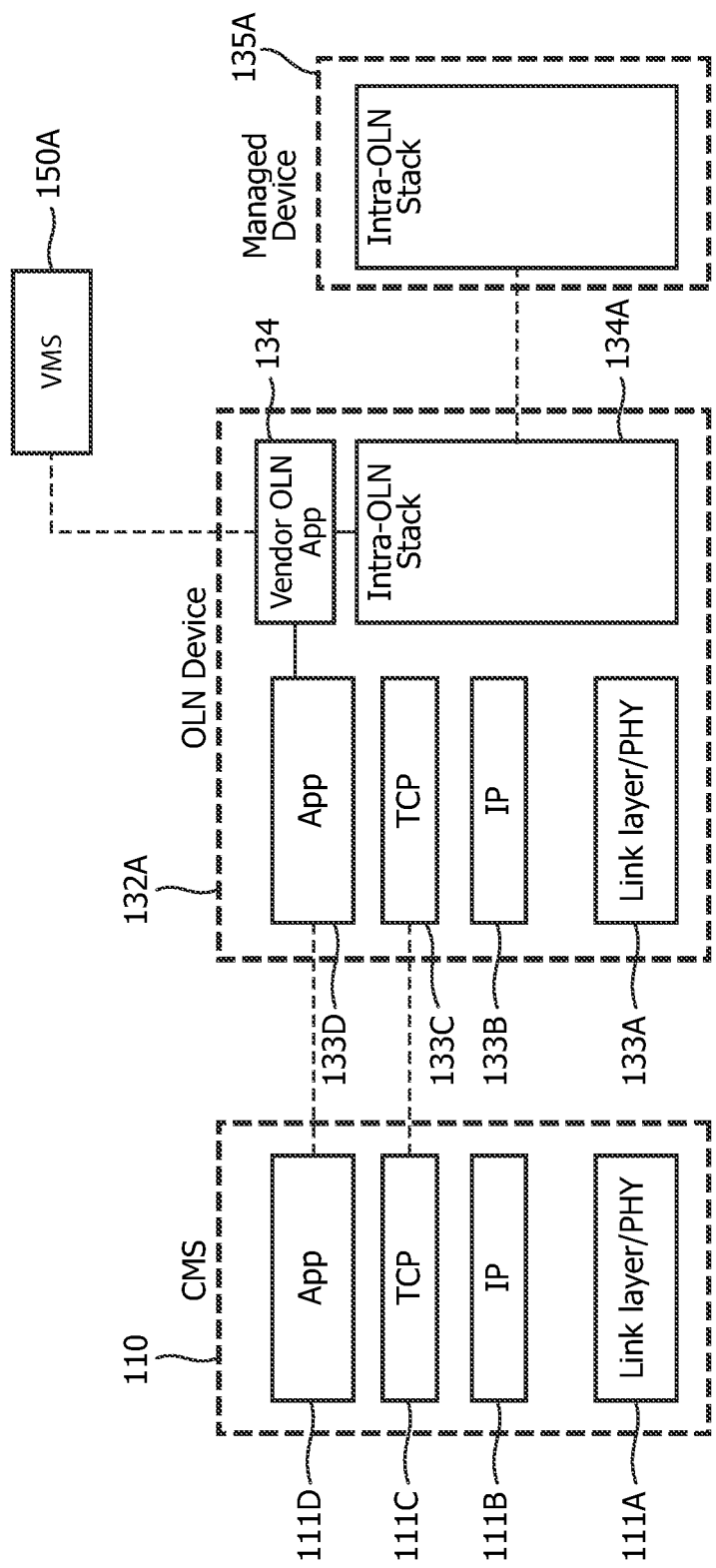
FIG. 2 illustrates an embodiment of a protocol stack implementation that may be implemented in the first embodiment of a multi-vendor OLN management system.

Referring to FIG. 2, an embodiment of a protocol stack implementation that may be implemented in the OLN management system 100 is illustrated. The CMS 110 is illustrated in communication with a direct communication OLN device 132A of OLN 130A. The CMS 110 includes a protocol stack having a link layer physical layer 111A, a network layer 111B, a transport layer 111C, and an application layer 111D. The OLN device 132A includes a protocol stack having a link layer physical layer 133A, a network layer 133B, a transport layer 133C, and an application layer 133D. The application layers 111D and 133D of the CMS 110 and the OLN device 132A utilize a common Application Protocol. In some embodiments the Application Protocol may be implemented following the structure and format of existing protocols such as, for example, the HTTP/XML protocol, together with a standard data format (application semantics) for management of OLNs that is well defined and implemented by different OLNs. In other embodiments the Application Protocol may not be implemented based on an existing protocol.

The direct communication OLN device 132A also includes a vendor-specific protocol for communication with VMS 150A and communication with other devices of OLN 130A, such as managed device 135A. The vendor-specific protocol will be dependent on the particular vendor utilized for the OLN 130A. In some embodiments the vendor-specific protocol may be implemented following the structure and format of existing protocols such as, for example, the HTTP/XML protocol, together with application semantics that are defined by the vendor. The illustrated vendor-specific second protocol stack has an intra-OLN component 134A for communication with other devices of OLN 130A and a VMS Application Protocol for communication with the VMS 150A. The translation between the Application Protocol and the vendor-specific protocol is performed at the OLN device 132A. This configuration allows both the CMS 110 and the VMS 150A to establish a direct connection with the OLN device 132A, manage the OLN device 132A, and manage other devices associated with the OLN device 132A. Also, this configuration allows the OLN device 132A to establish a direct connection with the CMS 110 and the VMS 150A. In some embodiments the OLN device 132A may communicate with the entire OLN 130A. In other embodiments the OLN device 132A may only communicate with certain segments of the OLN 130A or may not communicate with any other devices of the OLN 130A.

The common Application Protocol enables communication between the CMS 110 and the OLN device 132A. The CMS 110 may communicate with the OLN device 132A and/or other devices of the OLN 130A via the Application Protocol to provide for control of one or more light sources of the OLN 130A, control and management of the measurements and feedback configuration of one or more OLN devices of the OLN 130A, and/or management of one or more OLN devices. Also, one or more OLN devices of the OLN 130A may communicate with the CMS 110 to, for example, provide attribute information thereto and/or to provide confirmation of changed configurations in response to a configuration change request.

Although only direct communication OLN device 132A and managed device 135A are illustrated in FIG. 2, it is understood that OLN 130A may have other devices. Also, it is understood that such other devices may include other direct communication devices that may establish a direct connection with CMS 110 and/or VMS 150A and/or may include other managed devices that may not establish a direct connection with CMS 110 and/or VMS 150A.

The direct communication OLN devices of OLNs 130B, 130C that communicate with CMS 110 also utilize the common Application Protocol. The direct communication OLN devices of OLNs 130B, 130C also include vendor-specific protocols for communication with respective of VMSs 150B, 150C and communication with other devices of OLNs 130B, 130C. The vendor-specific protocols will be dependent on the particular vendor utilized for OLNs 130B, 130C. The translation between the Application Protocol and the vendor-specific protocol of each of the OLNs 130B, 130C will be performed at one or more direct communication OLN devices of respective of the OLNs 130B, 130C. This configuration allows both the CMS 110 and the VMS 150B to establish a connection with and manage the OLN 130B and allows both the CMS 110 and the VMS 150C to establish a connection with and manage the OLN 130C. The common Application Protocol enables communication between the CMS 110 and the OLNs 130B, 130C. The CMS 110 may communicate with the OLNs 130B, 130C via the Application Protocol to provide for control of one or more light sources of the OLNs 130B, 130C, control and management of the measurements and feedback configuration of one or more OLN devices of the OLNs 130B, 130C, and management of one or more OLN devices of the OLNs 130B, 130C.

Figure 3:
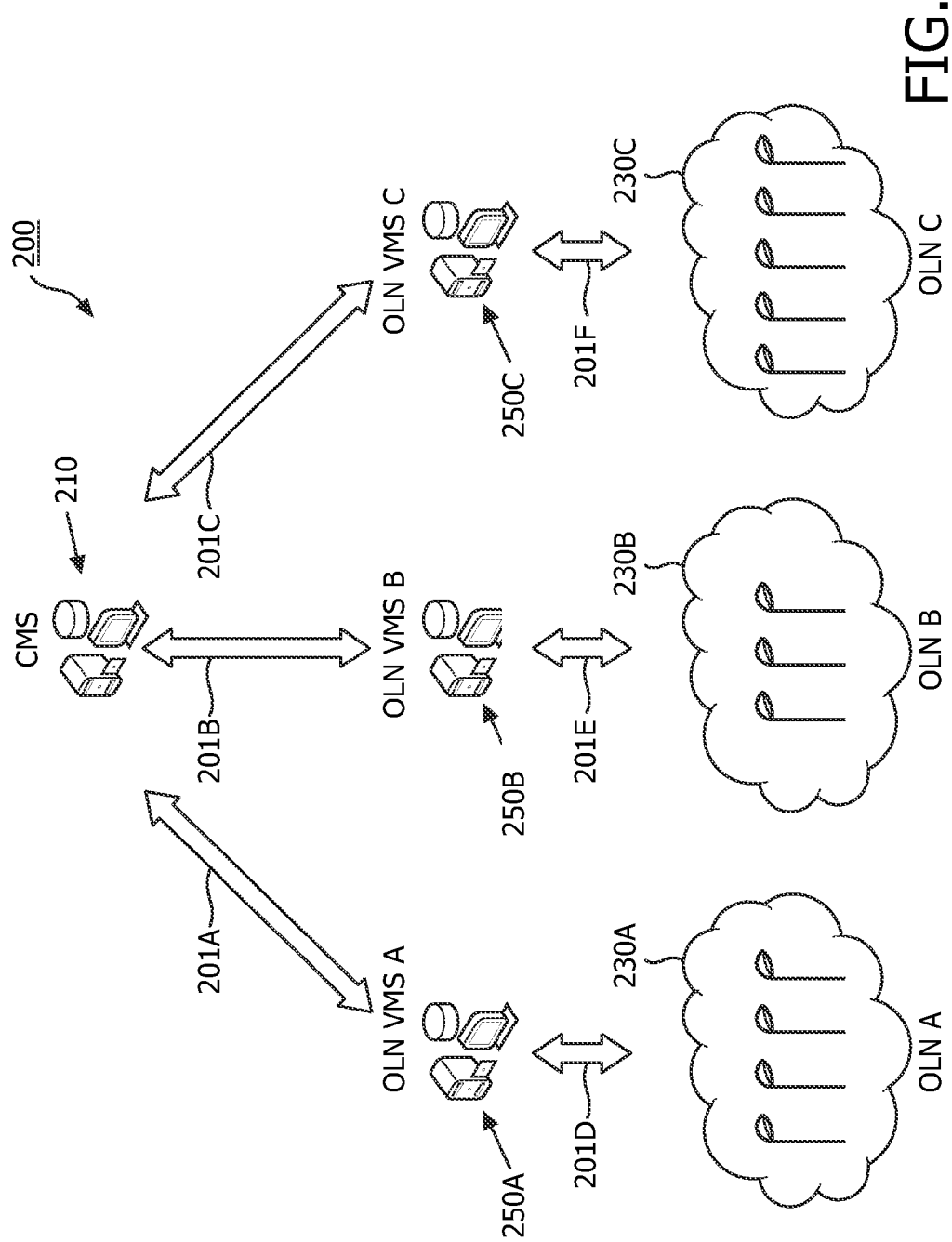
FIG. 3 illustrates a second embodiment of a multi-vendor OLN management system.

Referring to FIG. 3, a second embodiment of a multi-vendor OLN management system 200 is illustrated. The management system 200 includes a single CMS 210 in communication with a first VMS 250A via communication link 201A, a second VMS 250B via communication link 201B, and a third VMS 250C via communication link 201C. The first VMS 250A is in communication with a first OLN 230A via communication link 201D, the second VMS 250B in communication with a second OLN 230B via communication link 201E, and the third VMS 250C is in communication with a third OLN 230C via communication link 201F. Communication links 201A-F may include, for example, one or more wireless, wire/cable, and/or fiber optic links. Each of the VMSs 250A-C is topologically interposed between the CMS 210 and a respective of the OLNs 230A-C.

Each of the OLNs 230A-C may include one or more direct communication OLN devices equipped with control and communication capabilities to enable communication with a respective of the VMSs 250A-C and/or the CMS 210 (via a respective of the VMSs 250A-C). Each of the OLNs 230A-C may also optionally include one or more managed OLN devices that may be controlled and managed by the CMS 210 and/or a respective VMS 250A-C, but cannot establish direct connection with a respective of the VMSs 250A-C.

Generally speaking, and as described in additional detail herein, the CMS 210 communicates with each of the OLNs 230A-C via a respective of the VMSs 250A-C to remotely control and manage certain aspects of the devices of the OLNs 230A-C, while the VMSs 250A-C connect to their respective OLNs 230A-C and manage other aspects of the devices of the OLNs 230A-C and/or the OLNs 230A-C. In some embodiments the CMS 210 may communicate with the OLNs 230A-C via VMSs 250A-C to control and manage the lighting behavior of one or more light sources of the OLNs 230A-C; may communicate with the OLNs 230A-C via VMSs 250A-C to control and manage measurements and feedback configuration of one or more OLN devices; and may also communicate with the OLNs 230A-C via VMSs 250A-C to control and manage one or more OLN devices. In some embodiments the VMSs 250A-C may communicate with respective of the OLNs 230A-C to perform OLN commissioning of one or more devices of the OLNs 230A-C, to manage the OLNs 230A-C, and to provide security management for the OLNs 230A-C. Also, for example, the VMSs 250A-C may also communicate with respective of the OLNs 230A-C to control certain vendor specific functionality of one or more of the devices of the OLN.

Figure 4:
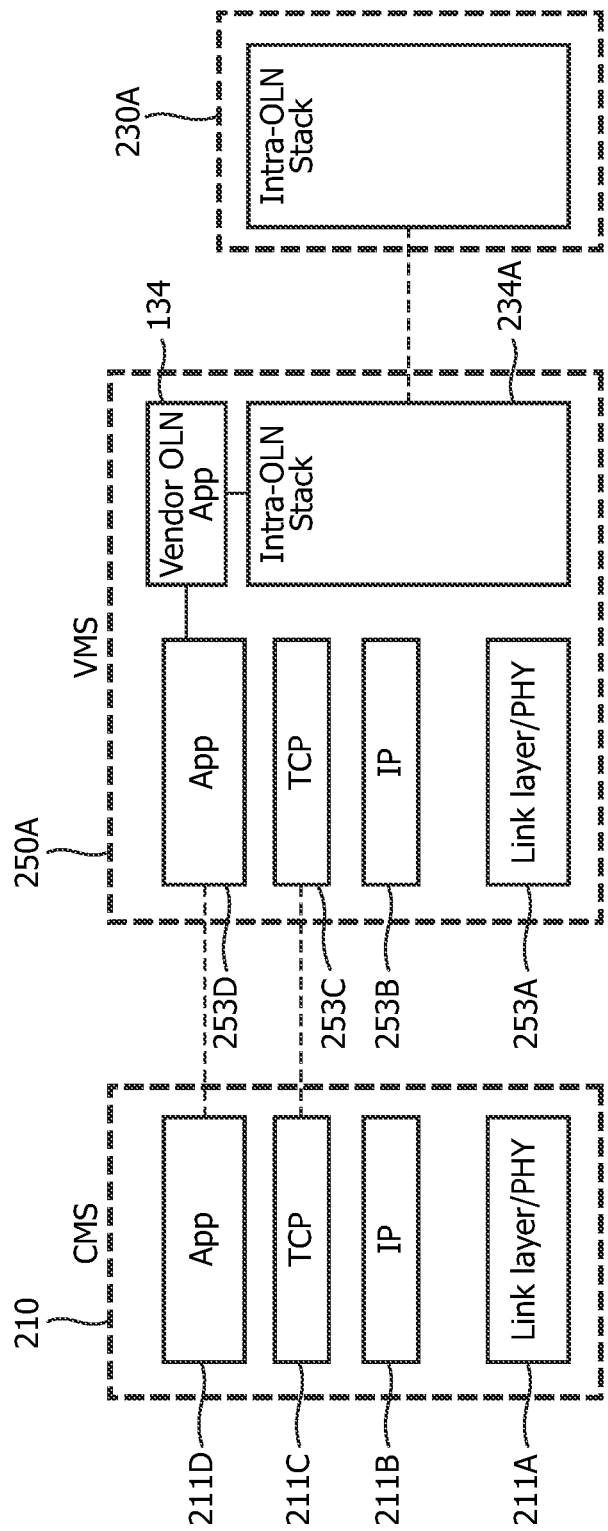
FIG. 4 illustrates an embodiment of a protocol stack implementation that may be implemented in the second embodiment of a multi-vendor OLN management system.

Referring to FIG. 4, an embodiment of a protocol stack implementation that may be implemented in the OLN management system 200 is illustrated. The CMS 210 is illustrated in communication with the first VMS 250A. The CMS 210 includes a protocol stack having a link layer physical layer 211A, a network layer 211B, a transport layer 211C, and an application layer 211D. The first VMS 250A includes a protocol stack having a link layer physical layer 253A, a network layer 253B, a transport layer 253C, and an application layer 253D. The application layers 211D and 253D of the CMS 210 and the device of the OLN 230A utilize a common Application Protocol. In some embodiments the Application Protocol may be implemented following the structure and format of existing protocols such as, for example, the HTTP/XML protocol. In other embodiments the Application Protocol may not be implemented based on an existing protocol.

The first VMS 250A also includes a vendor-specific protocol for communication with one or more devices of the OLN 230A. The vendor-specific protocol will be dependent on the particular vendor utilized for OLN 230A. The illustrated vendor-specific protocol has an OLN component 234A for communication with one or more devices of OLN 230A. The translation between the Application Protocol and the vendor-specific protocol is performed at the first VMS 250A. This configuration allows both the CMS 210 and the VMS 250A to establish a connection with the OLN 230A and manage the OLN 230A. The common Application Protocol enables communication between the CMS 210 and the OLN 230A (via VMS 250A) to provide for control of one or more light sources of the OLN 230A, control and management of the measurements and feedback configuration of one or more OLN devices of the OLN 230A, and management of one or more OLN devices. Also, one or more OLN devices of the OLN 230A may communicate with the CMS 210 to, for example, provide attribute information thereto and/or to provide confirmation of changed configurations in response to a configuration change request.

The second and third VMSs 250B, 250C also utilize the common Application Protocol for communication with the CMS 210 and translate the Application Protocol to a vendor-specific protocol of respective of the OLNs 230B, 230C. The vendor-specific protocols will be dependent on the particular vendor(s) utilized for OLNs 230B, 230C. This configuration allows both the CMS 210 and the VMS 250B to establish a connection with and manage the OLN 230B and allows both the CMS 210 and the VMS 250C to establish a connection with and manage the OLN 230C. The common Application Protocol enables communication between the CMS 210 and the OLNs 230B, 230C. The CMS 210 may communicate with the OLNs 230B, 230C via the VMSs 250B, 250C to provide for control of one or more light sources of the OLNs 230B, 230C, control and management of the measurements and feedback configuration of one or more OLN devices of the OLNs 230B, 230C, and management of one or more OLN devices of the OLNs 230B, 230C.

Figures 8, 9, 10:
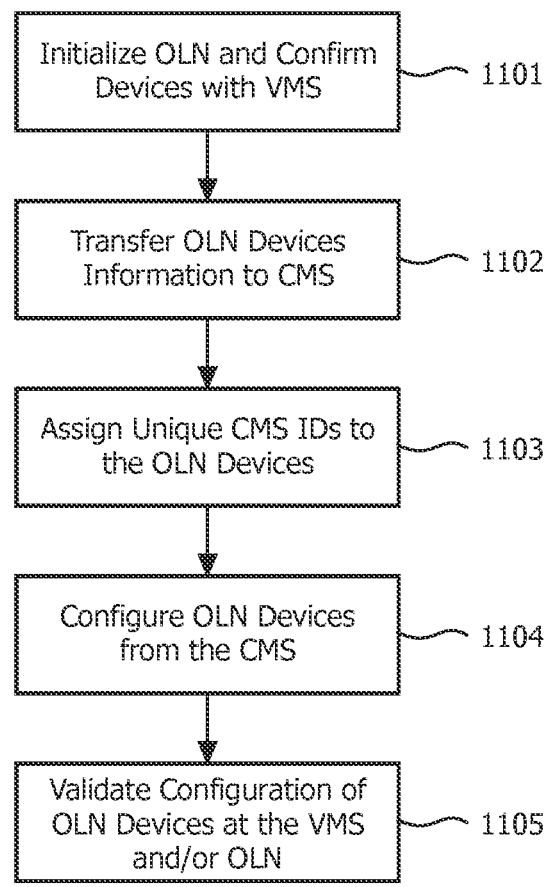
FIG. 8 illustrates an embodiment of a configuration request that may be sent to an OLN device by a CMS.
FIG. 9 illustrates an embodiment of a configuration response that may be sent to a CMS by an OLN device.
FIG. 10 illustrates an embodiment of a method of commissioning and configuring a multi-vendor OLN management system.

Referring to FIG. 10, an embodiment of a method of commissioning and configuring a multi-vendor OLN management system is illustrated. One or more aspects of the embodiment of commissioning and configuring an OLN management system may be utilized to commission and/or configure OLN management systems 100 and/or 200. At step 1101, devices of an OLN are initialized and confirmed with a VMS. In some embodiments installation and commissioning of the OLN devices may be done using vendor-specific equipment and procedures. For example, direct communication OLN devices and/or managed devices may execute an initialization procedure to form and/or join the OLN when initially powered up and may confirm their identities with the VMS via communication with the VMS (e.g., via the topology of FIG. 1 or the topology of FIG. 3). Also, for example, the network forming and/or joining may additionally or alternatively be triggered by a configuration assistant (CA) tool during the installation. For instance, a CA tool may read information from the devices of the OLN and upload such information to the VMS via a secure communications link. Also, for example, OLN devices may automatically initiate the interaction with the VMS to confirm security credentials (e.g., security keys stored in memory of the OLN devices at the factory) and join the OLN.

At step 1102, after the devices of the OLN have been authenticated by the VMS, information related to the devices of the OLN is provided to the CMS. In some embodiments information related to the device of the OLN is uploaded to the CMS via a transportable storage medium. For example, a commissioning engineer can upload a file with the OLN device data to the CMS. In some other embodiments a direct connection is established to the CMS from one or more devices of the OLN or other vendor specific devices (e.g., CA tool or the VMS) to transfer information related to the devices of the OLN. The information related to the devices of the OLN includes the attributes and capabilities of individual devices of the OLN.

In some embodiments each of the OLN devices shall implement a common set of attributes that is reported to and understood by the CMS. However, each of the OLN devices may optionally have more attributes than what it reports to the CMS. In some embodiments one or more of the attributes may be adjusted by the vendor. Also, in some embodiments, the vendor may direct which attributes to make available to the CMS. For example, in some embodiments a commissioning engineer may direct OLN devices to only provide certain attributes to the CMS. Also, for example, in some embodiments a VMS may alter which attributes are provided by the OLN to the CMS.

Referring to FIG. 5, a table of an embodiment of OLN device attributes that may be provided to a CMS is illustrated, along with a brief description of each of those device attributes. The attributes include Device Type, CMS Address, Name, Geolocation, Light Point Data, Segment Data, Sensor Data, and Vendor Specific Data. One of ordinary skill in the art, having had the benefit of the present disclosure, will recognize and appreciate that the provided table is an example of attributes that may be provided and that additional and/or alternative attributes may be provided in other embodiments.

Once the OLN device data is provided to the CMS, the CMS may confirm the information with the OLN devices. For instance, if the information is provided directly by the OLN device, the CMS may just confirm the reception of the data using the existing connection with the OLN device. If the information is provided by other means (e.g., VMS or CA tool upload), the CMS may try to establish a secure connection with the OLN devices and then confirm the device information.

Figure 6:
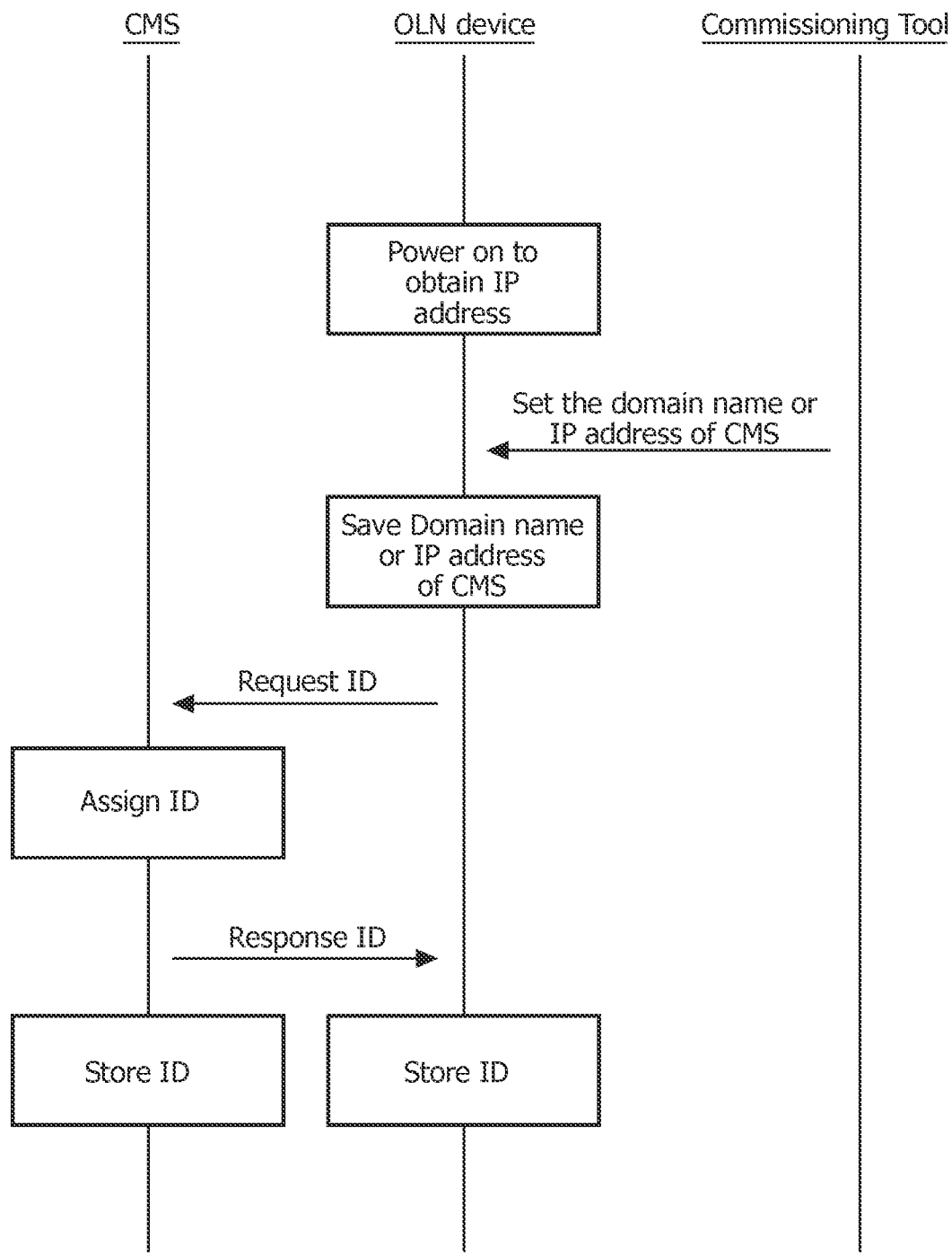
FIG. 6 illustrates an embodiment of a method of assignment of a CMS ID to a direct communication device of an OLN.

At step 1103, a unique CMS ID is assigned to each of the OLN devices. The CMS ID is utilized to uniquely identify each device and enable addressable network communication between the CMS and the OLN devices. A VMS associated with the OLN may also utilize the CMS ID or may alternatively utilize a different ID for addressable network communication between the VMS and the OLN devices. Referring to FIG. 6, an embodiment of a method of OLN device ID assignment is illustrated. During commissioning of the OLN, a commissioning tool provides the domain name or IP address of the CMS to the OLN devices. Utilizing the domain name or IP address of the CMS, each OLN device sends an ID request to the CMS. In response to the ID request, the CMS assigns a CMS ID, stores the CMS ID, and sends a response to the OLN device confirming assignment of the CMS ID. The response may include the CMS ID and the OLN device may store the CMS ID.

In another embodiment the CMS may assign a block of unique CMS IDs to the vendors and the vendors may assign those CMS IDs to the OLN devices during the vendor initialization of the OLN. For example, the CMS may communicate a block of unique CMS IDs to a VMS and the VMS may assign those CMS IDs to the OLN devices during the vendor initialization of the OLN. Also, for example, the CMS may communicate a block of unique CMS IDs to a vendor and a commissioning engineer may utilize a CA or other apparatus to assign those CMS IDs to the OLN devices during the vendor initialization of the OLN.

Figure 7:
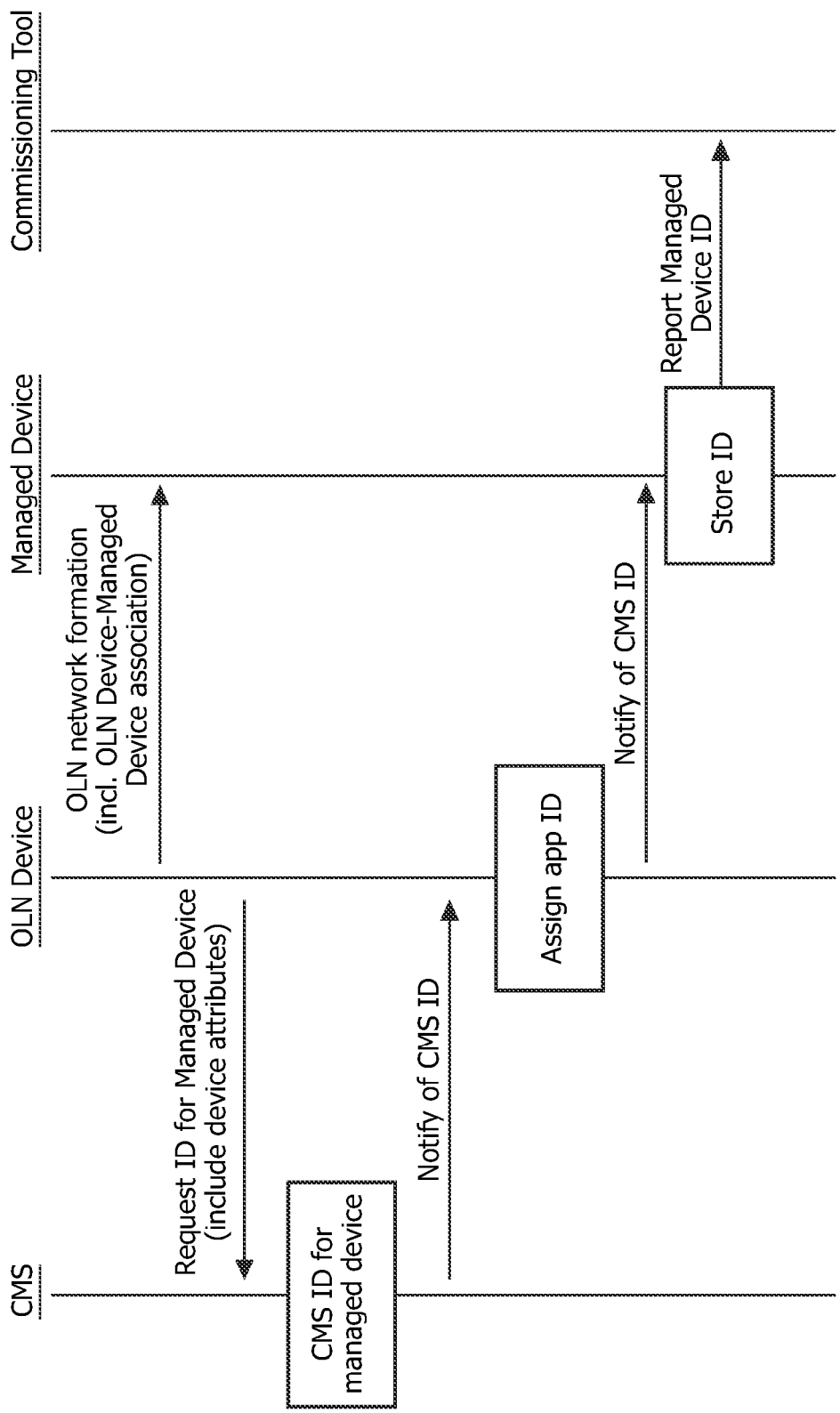
FIG. 7 illustrates an embodiment of a method of assignment of a CMS ID to a managed device of an OLN.

Managed devices of the OLN which rely on direct connection with direct communication OLN devices to establish the connection with the CMS may also acquire a CMS ID. In some embodiments such CMS ID may also be assigned to the managed devices by the VMS or other vendor's tools during the OLN initialization. As illustrated in FIG. 7, in some other embodiments the managed devices of the OLN may also request the CMS ID by contacting a direct communication OLN device, which will forward the managed device's ID request to the CMS, and relay the response (optionally with assigned CMS ID) to the managed device. The managed device may also relay the assigned CMS ID to a commissioning tool and/or to the VMS.

At step 1104, the OLN devices are configured from the CMS. After direct communication OLN devices and managed devices are identified and confirmed by the CMS, the CMS can configure the operation of certain aspects of the OLN devices via communication of device configuration messages to the OLN (either directly as illustrated in FIG. 1 or via an associated VMS as illustrated in FIG. 3).

For example, one or more configuration messages, such as a SET-CONFIG message having the general format illustrated in FIG. 7, may be transmitted to the OLN devices and contain new values for the attributes of the OLN devices. For example, lighting configuration messages may be directed to a segment controller controlling a plurality of lighting fixtures and contain values to adjust the on/off schedule of those lighting fixtures. Also, for example, lighting configuration messages may be directed at a lighting unit and adjust minimum and/or maximum dimming values of the lighting unit. OLN devices across networks from multiple vendors should be able to read and recognize the attributes in the configuration messages. If a specific attribute in the configuration message is not supported or valid, the OLN device to which it was directed may notify the CMS with an error message, which may also optionally indicate which attribute(s) is not valid. Some attributes of OLN devices may be vendor specific, and as such, the CMS may not have the capability to set such attributes, unless a special feature is enabled by the vendor.

The CMS may also send configuration attributes updates (e.g., via new SET_CONFIG messages) to one or more OLN devices at any time. Configuration changes may be generated in response to, inter alia, a change in the capabilities of the OLN devices, a user request, and/or a specific event that has been detected. For example, when a new light source is installed in a lighting unit of an OLN, the CMS can receive the change information (e.g., a user may manually input change or the lighting unit reports the change) and start operating the lighting unit in accord with its new capabilities.

OLN devices may also send a configuration change report message (e.g., CONIFG_REP messages having the general format illustrated in FIG. 9) to the CMS. The CMS may confirm/acknowledge the new attribute values/capabilities with the OLN devices. For example, an OLN device may inform the CMS of a vendor upgrade to the devices' software version, and the CMS may acknowledge the new value. Also, for example, an OLN device may confirm change of its configuration in response to a CMS configuration message via a configuration change report message.

At step 1105, certain configuration changes requested by the CMS to the OLN devices are optionally validated at the VMS and/or the OLN. Certain attributes may impact the overall OLN performance, and as such, their changes may be coordinated with the VMS. For example, the frequency of measurement reports that would be generated by the OLN devices in response to a request by the CMS may overload the OLN and cause serious availability problems with the OLN. Although users may be allowed to configure such parameters from the CMS, in some embodiments the implementation of the requested configuration must be confirmed by the VMS and/or the OLN. This may be done by connecting to the VMS once a new request for change is received and/or by hosting local OLN implementation policies that are set by the VMS, and checking all requested configuration changes against such policies. In some embodiments, the maximum frequency of periodic power metering or other measurement reports from devices to the CMS may be controlled by the VMS in order to avoid overload of the OLN. Also, in some embodiments, requests by the CMS to increase the measurement reporting frequency of OLN devices above a certain threshold could be denied by the OLN. Accordingly, the VMS and/or OLN may override certain configuration change requests by the CMS (e.g., by substituting alternative configuration values determined at the VMS and/or OLN) and/or may deny such requested changes (optionally suggesting other acceptable alternatives). In some embodiments the configuration change report messages may optionally be used to confirm an overridden attribute configuration and/or to suggest a change to a previous attribute configuration request from the CMS.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An outdoor lighting network management system, comprising:
   at least a first and a second outdoor lighting network each including a plurality of outdoor lighting network devices, wherein each of said first and said second outdoor lighting networks use a respective a first or second protocol to communicate with their respective plurality of outdoor lighting network devices;
   a central management system in communication with each of said outdoor lighting networks, said central management system sending outdoor lighting network configuration commands to each of said outdoor lighting networks using a common network protocol and receiving outdoor lighting network device information from each of said outdoor lighting networks using the common network protocol, said outdoor lighting network device information including details of said lighting network devices;
   wherein said outdoor lighting network configuration commands from said central management system using the common protocol is translated by said first and said second outdoor lighting networks to said first or said second protocol and used to set a configuration of at least one of said outdoor lighting network devices;
   a first vendor management system in communication with only said first outdoor lighting networks.

2. The system of claim 1, further comprising a second vendor management system in communication with only said second outdoor lighting network.

3. The system of claim 1, wherein at least a group of said configuration commands sent to said first outdoor lighting network is also sent to said first vendor management system and verified by said first vendor management system.

4. The system of claim 1, wherein said lighting configuration commands include at least one of a dimming configuration, a schedule configuration, a measurements configuration, and a color control configuration.

5. The system of claim 1, wherein at least a group of said configuration commands sent to said first outdoor lighting network is also sent to said first vendor management system and verified by said first vendor management system prior to altering said configuration of at least one of said outdoor lighting network devices of said first outdoor lighting network.

6. The system of claim 1, wherein said central management system is in communication with each of said outdoor lighting networks via a central management system protocol stack having a first application layer.

7. The system of claim 5, wherein said first vendor management system is in communication with said first outdoor lighting network via a first vendor protocol stack having a second application layer distinct from said first application layer.

8. The system of claim 6, further comprising a second vendor management system in communication with said second outdoor lighting network, wherein said second vendor management system is in communication with said second outdoor lighting network via a second vendor protocol stack having a third application layer distinct from said first application layer and distinct from said second application layer.

9. The system of claim 1, wherein said first outdoor lighting network is topologically interposed between said central management system and said first vendor management system.

10. The system of claim 1, wherein said first vendor management system is topologically interposed between said central management system and said first outdoor lighting network.

11. A method of managing a plurality of outdoor lighting networks, comprising
   receiving first central management system configuration commands from a central management system;
   translating said first central management configuration commands to a first set of outdoor lighting network configuration commands readable only by first devices of said first outdoor lighting network;
   receiving second central management system configuration commands from said central management system;
   translating said second central management configuration commands to a second set of outdoor lighting network configuration commands readable only by second devices of said second outdoor lighting network where the second set of outdoor lighting network configuration commands are different from the first set of outdoor lighting network configuration commands;
   receiving first vendor management commands from a first vendor management system readable only by said first devices; and
   receiving second vendor management commands from a second vendor management system readable only by said second devices.

12. The method of claim 11, further comprising receiving device information data of said first devices, translating said device information data to distinct and different central management system data readable by said central management system, and sending said central management system data to said central management system.

13. The method of claim 11, further comprising validating said first central management configuration commands.

14. An outdoor lighting network management apparatus, comprising:
   at least one central management system connection, said central management system connection receiving a central management configuration commands from a central management system;
   at least one controller operable to translate said central management configuration command to a first or a second configuration command to configure a first or a second outdoor lighting network where said first and said second configuration commands are different for each of the first and the second outdoor lighting networks;
   at least one outdoor lighting network connection sending said central management directed outdoor lighting network configuration commands to at least one outdoor lighting network device;
   a vendor management system interface, said vendor management system interface receiving vendor management commands from a vendor management system.

15. The apparatus of claim 14, wherein at least some of said vendor management commands direct whether at least some of said configuration commands are sent to said at least one outdoor lighting network device.

16. The apparatus of claim 14, wherein said central management system connection transmits outdoor lighting network device information to said central management system, said outdoor lighting network device information including attributes of said at least one outdoor lighting network device.

17. The apparatus of claim 16, wherein said central management system connection transmits outdoor lighting network configuration change confirmation to said central management system, said outdoor lighting network configuration change confirmation sent in response to said at least one outdoor lighting network device changing configuration based on said outdoor lighting network configuration commands.

18. The apparatus of claim 14, wherein said vendor management commands include at least one of outdoor lighting network commissioning commands, outdoor lighting network management commands, outdoor lighting network troubleshooting commands, and outdoor lighting network security management commands.

19. The apparatus of claim 14, wherein said central management system connection, said outdoor lighting network connection, and said vendor management system interface are all at a direct communication lighting network device.

20. The apparatus of claim 14, wherein said central management system connection, said outdoor lighting network connection, and said vendor management interface are all at said vendor management system.

\* \* \* \* \*